United States Patent
Lloyd (10) Patent No.: US 7,938,871 B2
(45) Date of Patent: May 10, 2011

(54) VEHICLE FILTER ASSEMBLY

(75) Inventor: Robert Lloyd, Whitmore Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 254 days.

(21) Appl. No.: 12/394,668

(22) Filed: Feb. 27, 2009

(65) Prior Publication Data
US 2010/0218466 A1    Sep. 2, 2010

(51) Int. Cl.
*B01D 45/12* (2006.01)
(52) U.S. Cl. .............. 55/337; 55/429; 55/433; 55/459.1
(58) Field of Classification Search .............. 55/337, 55/429, 432, 433, 459.1
See application file for complete search history.

(56) References Cited

U.S. PATENT DOCUMENTS

| | | | |
|---|---|---|---|
| 3,034,647 A * | 5/1962 | Giesse | 209/710 |
| 3,853,518 A | 12/1974 | Tu et al. | |
| 5,638,786 A | 6/1997 | Gimby | |
| 6,042,628 A | 3/2000 | Nishikiori et al. | |
| 6,228,151 B1 | 5/2001 | Conrad et al. | |
| 6,599,350 B1 | 7/2003 | Rockwell et al. | |
| 6,878,185 B2 | 4/2005 | Fuhling et al. | |
| 7,383,722 B2 | 6/2008 | Tsuyuki et al. | |

* cited by examiner

*Primary Examiner* — Robert A Hopkins
(74) *Attorney, Agent, or Firm* — Global IP Counselors, LLP (57) ABSTRACT

A vehicle filter assembly includes a housing, a cyclone-inducing structure and a self-cleaning trap mechanism. The housing has an inlet, an outlet and a trap aperture. The cyclone-inducing structure is disposed within the housing between the inlet and the outlet to separate particulate from gases passing through the housing from the inlet to the outlet. The self-cleaning trap mechanism is movably arranged with respect to the trap aperture to move between a closed orientation sealing the trap aperture and an opened orientation exposing the trap aperture to release particulate from the housing.

20 Claims, 9 Drawing Sheets

VEHICLE FILTER ASSEMBLY

BACKGROUND OF THE INVENTION

1. Field of the Invention

The present invention relates to a filter. More specifically, the present invention relates to a filter that separates particulate from air.

2. Background Information

Filters used to separate particulate material from air are well-known. A problem with such filters is that they must be replaced on a regular basis. Alternatively, such filters must be removed, disassembled and cleaned to remove particulate.

In view of the above, it will be apparent to those skilled in the art from this disclosure that there exists a need for an improved filter that does not need to be disassembled to remove particulate. This invention addresses this need in the art as well as other needs, which will become apparent to those skilled in the art from this disclosure.

SUMMARY OF THE INVENTION

One object of the present invention is to provide a filter with self-cleaning capabilities.

In accordance with one aspect of the present invention, a vehicle filter assembly includes a housing, a cyclone-inducing structure and a self-cleaning trap mechanism. The housing has an inlet, an outlet and a trap aperture. The cyclone-inducing structure is disposed within the housing between the inlet and the outlet to separate particulate from gases passing through the housing from the inlet to the outlet. The self-cleaning trap mechanism is movably arranged with respect to the trap aperture to move between a closed orientation sealing the trap aperture and an opened orientation exposing the trap aperture to release particulate from the housing.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
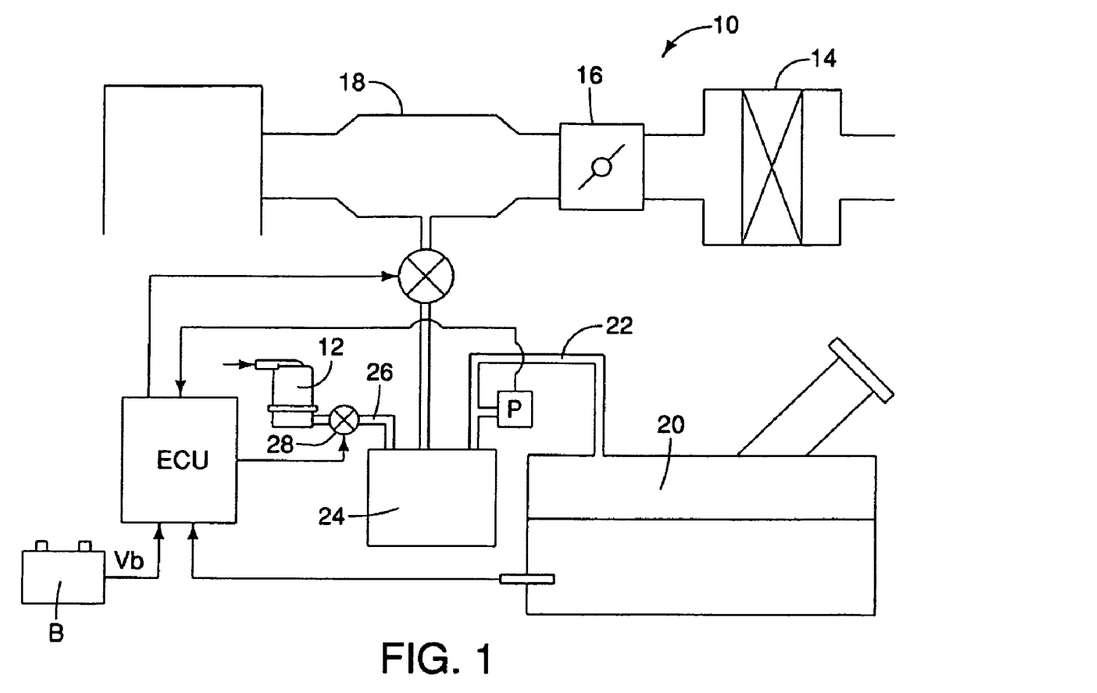
FIG. 1 is a schematic view of a portion of a vehicle having an internal combustion engine that includes a fuel vapor treatment system with a filter in accordance with a first embodiment of the present invention.

Referring initially to FIG. 1, a portion of a vehicle having an internal combustion engine (shown generally at reference numeral 10) is illustrated that utilizes a filter 12 in accordance with a first embodiment of the present invention. The filter 12 is part of a fuel vapor treatment system of the internal combustion engine 10.

The internal combustion engine 10 has an air intake system that includes an air cleaner 14, a throttle valve 16, and an intake air manifold 18 in that order from an upstream end to a downstream end. A fuel injection valve or injector (not shown) is provided in each of the cylinders of the engine 10 to supply fuel to the cylinders from the fuel tank 20 in a conventional manner.

The fuel vapor treatment system is fluidly connected between the intake air manifold 18 of the engine 10 and the fuel tank 20. The fuel vapor treatment system basically includes a fuel vapor guide passage 22 that is arranged to guide fuel vapor produced in the fuel tank 20 to a canister 24. The canister 24 is configured to temporarily adsorb the fuel vapor produced in the fuel tank 20. For example, the canister 24 contains a fuel adsorbing material (e.g., activated carbon or other adsorbing material—not shown) that temporarily adsorbs the fuel vapor. The canister 22 is provided with a fresh air introducing port 26, a control valve 28 that selectively opens to the filter 12. The filter 12 is open at one end to the atmosphere, as described in greater detail below.

The fuel vapor treatment system includes a diagnostic mode. The control valve 28 is opened and closed during the diagnostic mode selectively drawing fresh air into the filter 12 and the canister 24 in a conventional manner. Operations of the control valve 28 by the electronic control unit (ECU), which is powered by a battery B, and operation of the engine 10 are conventional in nature. Therefore a further corresponding description of the engine 10 and the fuel vapor treatment system is omitted for the sake of brevity.

A detailed description of a first embodiment of the filter 12 is now provided with specific reference to FIGS. 2-11. The filter 12 can be made of any of a variety of materials, such as metal, metal alloys, polymers, plastics, composite materials and/or combinations of these materials. The filter 12 basically includes a housing 40 (FIGS. 2-4, 7 and 8), a cyclone-inducing structure 42 (FIGS. 3, 4, 7 and 8) and a self-cleaning trap mechanism 44 (FIGS. 3, 4, 7 and 8).

As best shown in FIGS. 3, 4, 7 and 8, the housing 40 basically includes an upper end 50, a lower end 52, an annular inner wall 54, an annular outer wall 56 (a side wall), an inlet 58, an outlet 60 and a trap aperture 62. The upper end 50 includes the inlet 58, which is described in greater detail below. The lower end 52 is open thereby defining the trap aperture 62, which is also described in greater detail below.

The annular inner wall 54 and the annular outer wall 56 (the side wall) are joined at the lower end 52 of the housing 40 but spaced apart from one another defining a hollow annular chamber 64 therebetween. The annular outer wall 56 includes an upper portion 56a and a lower portion 56b. The upper portion 56a and the lower portion 56b are separate portions with respect to the depicted embodiment. The annular outer wall 56 is divided into the upper portion 56a and the lower portion 56b for assembling purposes only. However, it should be understood from the drawings and description herein, that the division of the annular outer wall 56 into the upper portion 56a and the lower portion 56b is not a required feature of the invention, but merely one of design choice and for ease of assembly.

The annular outer wall 56 extends between the upper end 50 and the lower end 52. However, the annular inner wall 54 extends upward from the lower end 52 but is spaced apart from the upper end 50 of the housing 40. Consequently an annular gap G is defined between an inner surface of the upper end 50 and an upper edge of the annular inner wall 54. A filter element 66 is disposed in the annular gap G. The filter element 66 can be made of any of a variety of filter materials, such as paper, foam made of polymer or plastic materials or microfiber materials and the like.

The annular inner wall 54 also defines a central interior chamber 68. The annular inner wall 54 also includes a plurality of gussets 69 that extend radially inward as shown in FIGS. 3, 4, 7 and 8. As described in greater detail below, the cyclone-inducing structure 42 is disposed within the central interior chamber 68 at least partially supported within the annular inner wall 54 by the gussets 69.

The lower end 52 of the housing 40 further includes an annular recess 70 that is dimensioned to receive a seal 72 that seals the cyclone-inducing structure 42, as described in greater detail below. The upper end 50 of the housing 40 is basically closed (except for the inlet 58) while the lower end 52 is open, thereby defining the trap aperture 62. The seal 72 encircles the trap aperture 62.

Figure 2:
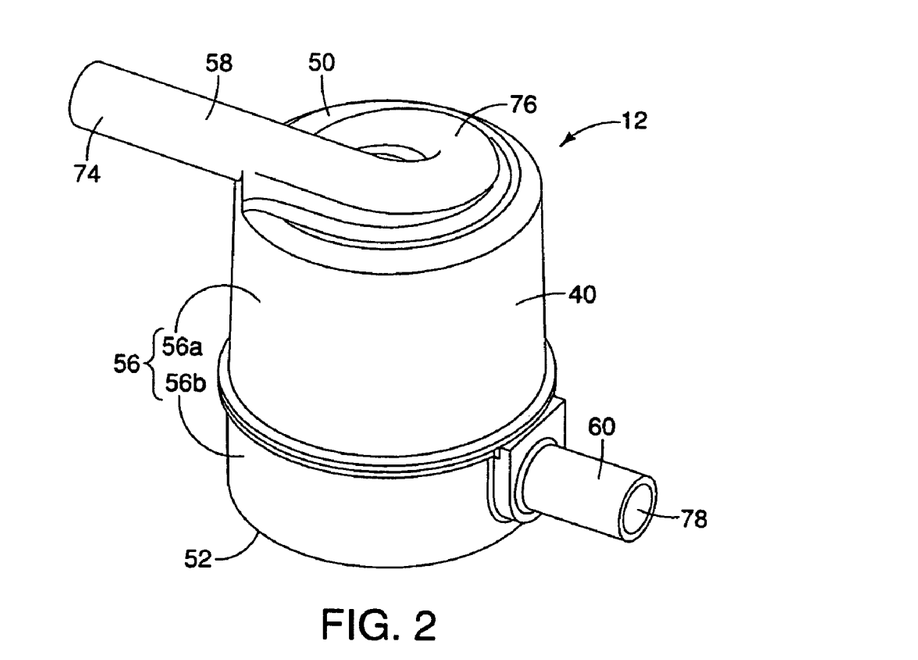
FIG. 2 is a perspective view of the filter shown removed from the fuel vapor treatment system in accordance with the first embodiment of the present invention.
Figure 5:
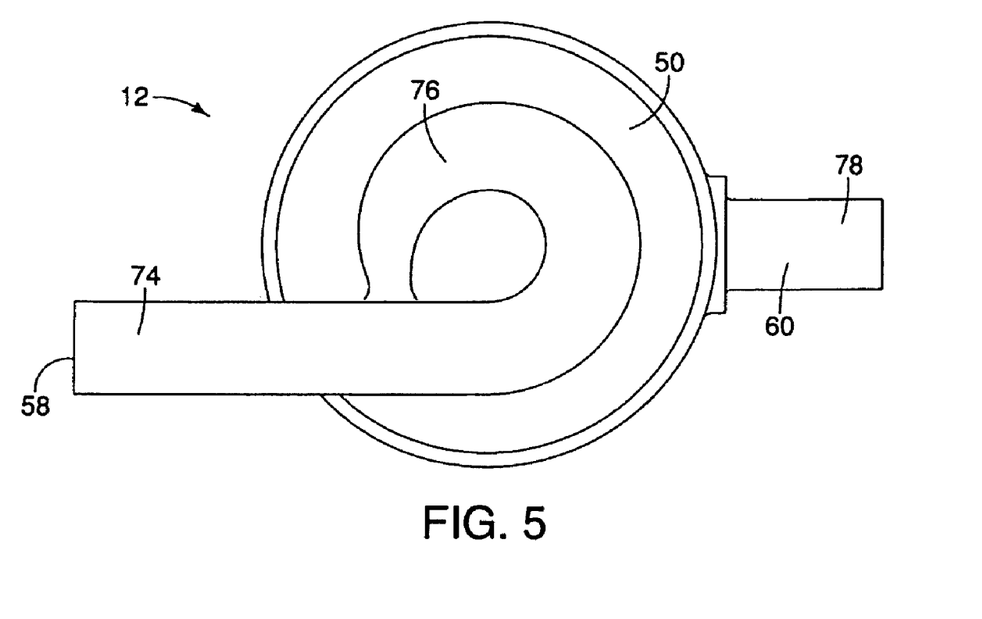
FIG. 5 is a top plan view of the filter in accordance with the first embodiment of the present invention.
Figure 6:
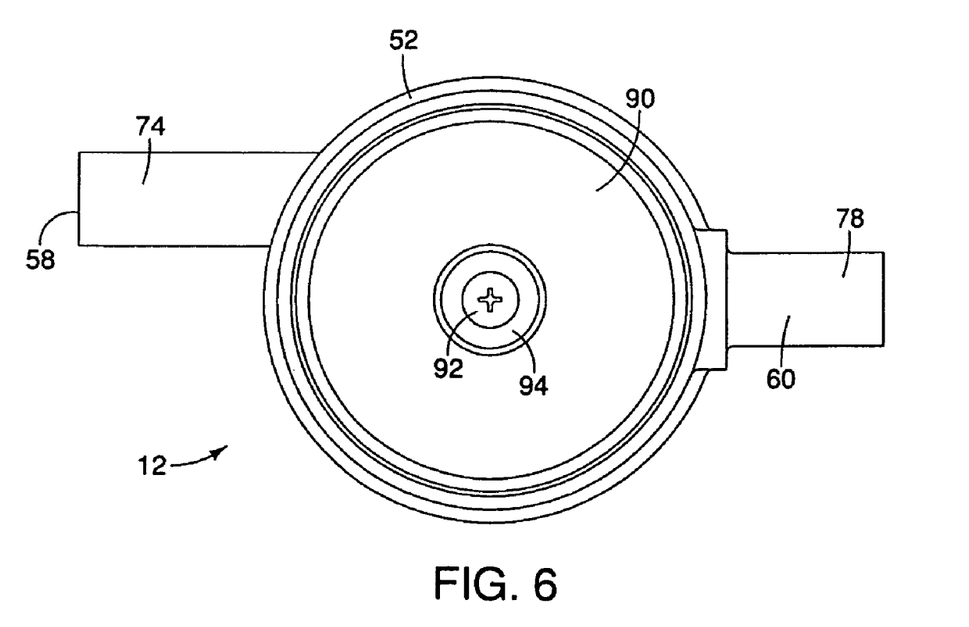
FIG. 6 is a bottom plan view of the filter in accordance with the first embodiment of the present invention.
Figure 7:
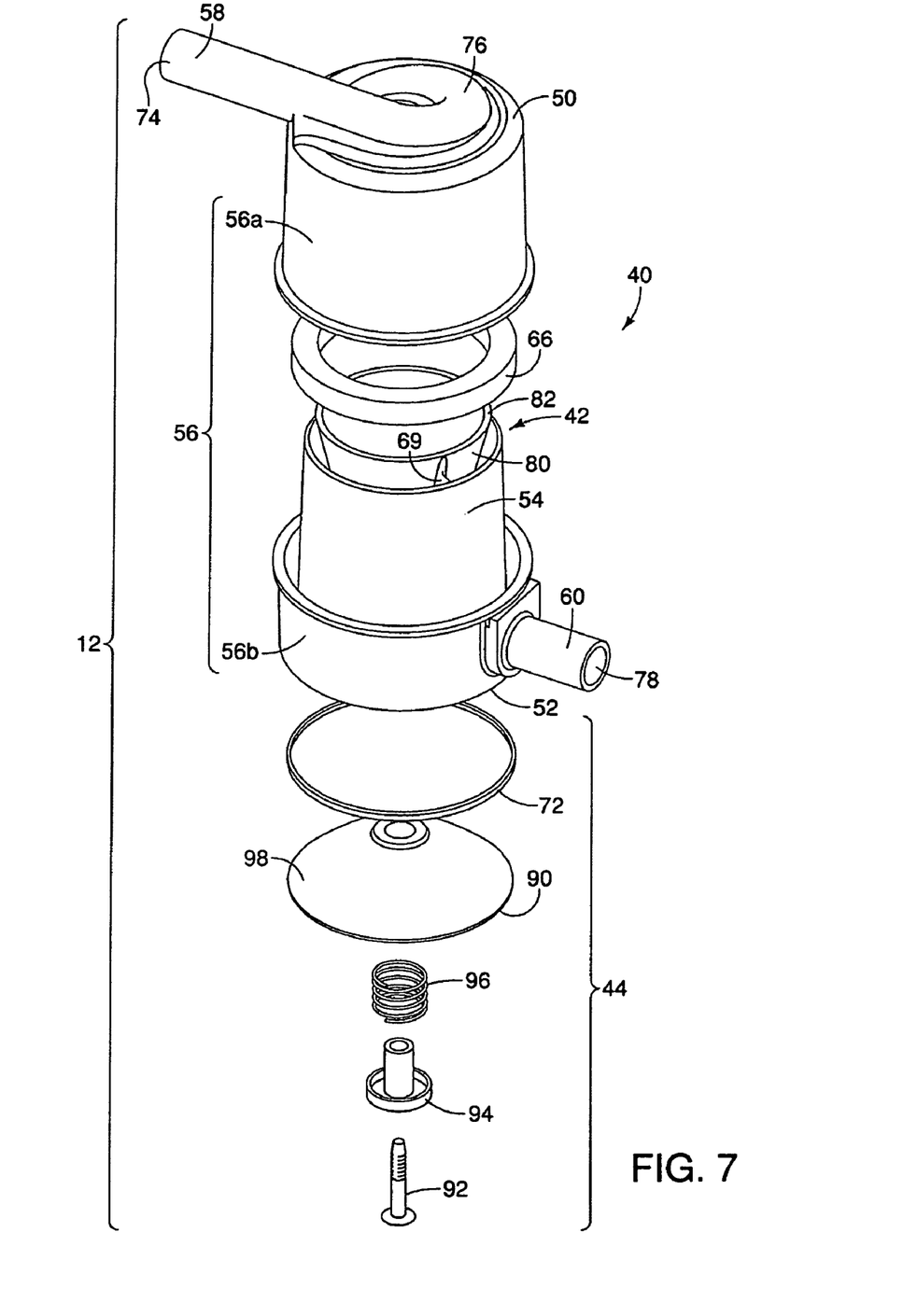
FIG. 7 is a perspective exploded view showing the various elements of the filter in accordance with the first embodiment of the present invention.

As best shown in FIG. 2, the inlet 58 includes a tube 74. The tube 74 is integrally formed with or attached to the upper end 50 of the housing 40. The tube 74 extends from the upper end 50 in a radially outward direction relative to the cylindrical shape of the annular outer wall 56. As shown in FIGS. 2, 5 and 7, the tube 74 joins with the upper end 50 of the housing 40 and is in fluid communication with a spiral shaped passageway 76 at the upper end 50 of the housing. The spiral shaped passageway 76 forms part of the cyclone-inducing structure 42, as described in greater detail below.

Figure 3:
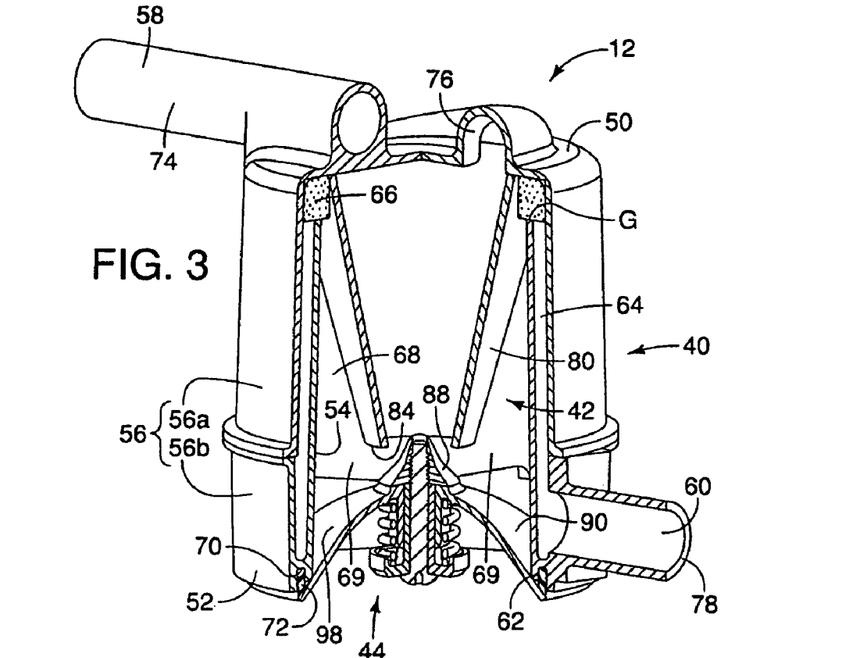
FIG. 3 is a perspective view of the filter with a cutaway section showing internal features of the filter such as a self-cleaning trap mechanism shown in a closed orientation in accordance with the first embodiment of the present invention.
Figure 4:
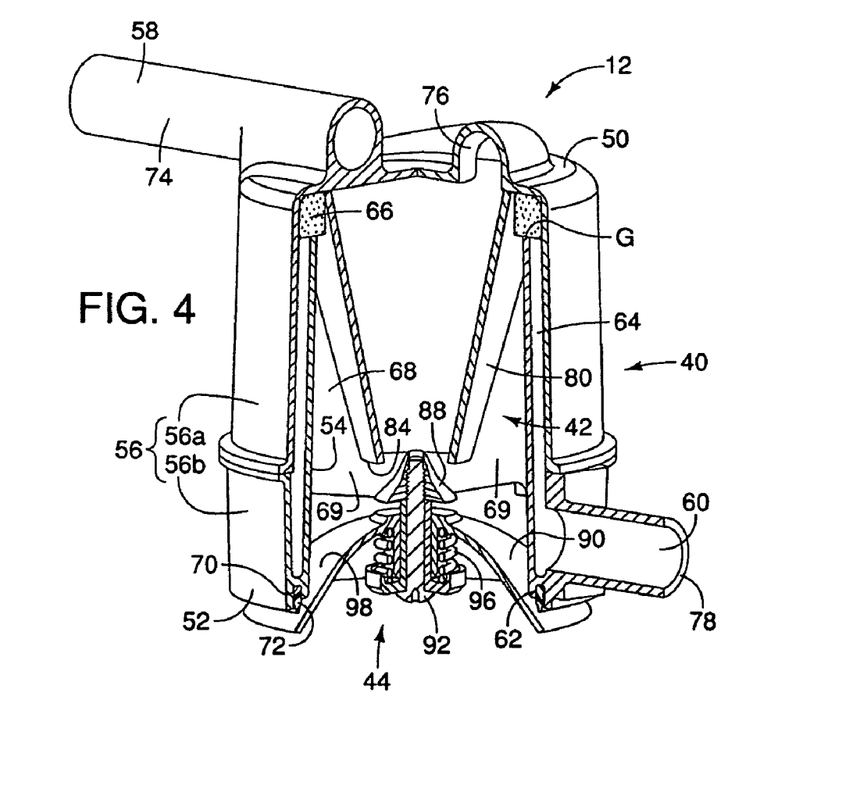
FIG. 4 is another perspective view of the filter similar to FIG. 3, with a cutaway section showing the internal features of the filter such as the self-cleaning trap mechanism shown here in an open orientation in accordance with the first embodiment of the present invention.

As shown in FIGS. 2, 3 and 4, the outlet 60 is formed or otherwise attached to an outer surface of the annular outer wall 56 (the side wall of the housing 40). The outlet 60 is located adjacent the lower end 52 of the housing 40 in the first embodiment. The outlet 60 includes a tube 78 that is in fluid communication with the hollow annular chamber 64 formed between the annular inner wall 54 and the annular outer wall 56, as indicated in FIGS. 3 and 4.

As shown in FIGS. 3, 4, 7 and 8, the hollow annular chamber 64 formed between the annular inner wall 54, the annular outer wall 56 and the annular gap G serves as a fluid communication passage that is in fluid communication with both the central interior chamber 68 of the housing 40 and the outlet 60. Hence, the outlet 60 is in fluid communication with the central interior chamber 68 of the housing 40.

The cyclone-inducing structure 42 is disposed within the central interior chamber 68 of the housing 40 between the inlet 58 and the outlet 60 to separate particulate from gases passing through the housing from the inlet 58 to the outlet 60. The cyclone-inducing structure 42 basically includes an inverted conically-shaped member 80 with an upper open end 82 in fluid communication with the inlet 58 and a lower open end 84 in fluid communication with the outlet 60.

Figure 8:
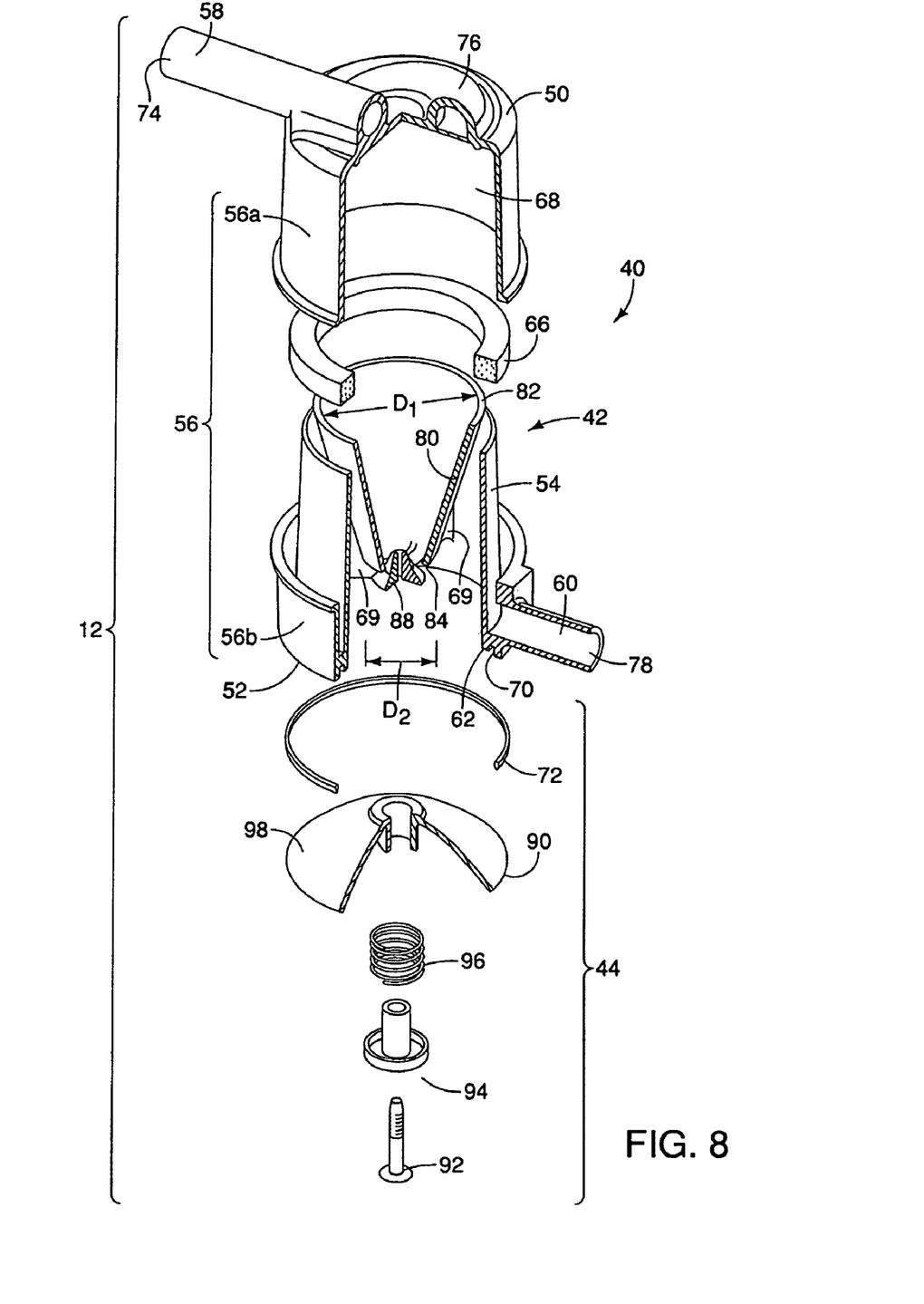
FIG. 8 is another perspective exploded view similar to FIG. 7 but with a cutaway section, showing the various elements of the filter in accordance with the first embodiment of the present invention.

As best shown in FIG. 8, the upper open end 82 of the conically-shaped member 80 has a first diameter $D_1$ and the lower open end 84 has a second diameter $D_2$ that is smaller than the first diameter $D_1$. The upper open end 82 is welded, glued or otherwise fixedly attached to an inner surface of the upper end 50 of the housing 40, as indicated in FIGS. 3 and 4. An outer surface of the conically-shaped member 80 is also connected to the gussets 69. Thus the conically-shaped member 80 is supported within the housing 40 at the upper open end 82 and along its outer surface by the upper end 50 of the housing 40 and the gussets 69 of the annular inner wall 54. The lower open end 84 of the cyclone-inducing structure 42 is located above the trap aperture 62.

The cyclone-inducing structure 42 functions in the following manner. Air enters the inlet 58 and follows a spiral trajectory as the air passes through the spiral-shaped passageway 76 at the upper end 50 of the housing 40. Once the air hits the inner surface of the inverted conically-shaped member 80, the spiral trajectory of the air continues as it moves toward the lower open end 84 of the inverted conically-shaped member 80. Also, the inner diameter of the inverted conically-shaped member 80 decreases as the air moves toward the lower open end 84. This increases the centripetal acceleration of the air, forcing solid and semi-solid materials hereinafter referred to as particulate matter away from the center of the inverted conically-shaped member 80. At the lower open end 84 the particulate matter drops onto the self-cleaning trap mechanism 44. The air continues within the central interior chamber 68, through the filter element 66 in the annular gap G and then through the outlet 60.

The self-cleaning trap mechanism 44 is movably arranged with respect to the trap aperture 62 to move between a closed orientation shown in FIG. 3 sealing the trap aperture 62 and an opened orientation shown in FIG. 4 exposing the trap aperture 62 and thereby releasing the particulate from the housing 40. In other words, when the self-cleaning trap mechanism 44 moves to the opened orientation shown in FIG. 4, particulate is able to drop out of the trap aperture 62.

A description of the self-cleaning trap mechanism 44 is now provided with specific reference to FIGS. 3, 4 and 7-11. The self-cleaning trap mechanism 44 basically includes a support portion 88, plug 90, a fastener 92, a retainer 94 and a biasing spring 96.

As indicated in FIGS. 3 and 4, the support portion 88 of the self-cleaning trap mechanism 44 is supported by the lower open end 84 of the inverted conically-shaped member 80 and at least one of the gussets 69. More specifically, the support portion 88 is formed integrally with the lower open end 84 of the inverted conically-shaped member 80 or is welded, fixed by adhesive or otherwise fixedly attached to the lower open end 84 of the inverted conically-shaped member 80 and at least one of the gussets 69.

The plug 90 is a semi-spherical shaped member that includes a convex inner surface 98. As shown in FIG. 3, with the self-cleaning trap mechanism 44 in the closed orientation, the convex inner surface 98 is positioned within the housing 40. However, as shown in FIG. 4, with the self-cleaning trap mechanism 44 in the open orientation, the convex inner surface 98 at least partially extends out of the trap aperture 62 and the housing 40. The plug 90 is dimensioned to cover the trap aperture 62 with the self-cleaning trap mechanism 44 in the closed orientation, thereby sealing the central interior chamber 68 of the housing 40.

When installed, the fastener 92 is a conventional element that extends through a central aperture of the retainer 94, through a central aperture in the plug 90 and further threadedly engages an opening in the support portion 88. Thus, the plug 90 is supported at the lower end of the cyclone-inducing structure 42.

The biasing spring 96 is disposed between the retainer 94 and a lower surface of the plug 90. The biasing spring 96 biases the plug 90 to the closed orientation such that the plug 90 moves to the opened orientation in response to a predetermined downward force acting on the plug 90. More specifically, the biasing spring 96 (a spring member) is dimensioned to apply at least 5 N (Newtons) of force against the plug 90 such that the plug 90 is biased to the closed orientation.

The self-cleaning trap mechanism 44 operates in the following manner. If particulate separated by the cyclone-inducing structure 42 reaches a sufficient mass, the weight of the particulate combined with motions of the vehicle can overcome the force of the biasing spring 96, thereby moving the plug 90 from the closed orientation shown in FIG. 3 to the open orientation shown in FIG. 4. The particulate can then fall out of the filter 12. Further predetermined movements of the vehicle can also move the plug 90 to the open orientation shown in FIG. 4. Specifically, when the vehicle goes over a bump, the rapid upward and downward movement of the vehicle can exert a force of 5 N or greater on the plug 90. Under such circumstances, the plug 90 will move to the open orientation shown in FIG. 4.

Figures 9, 10, 11:
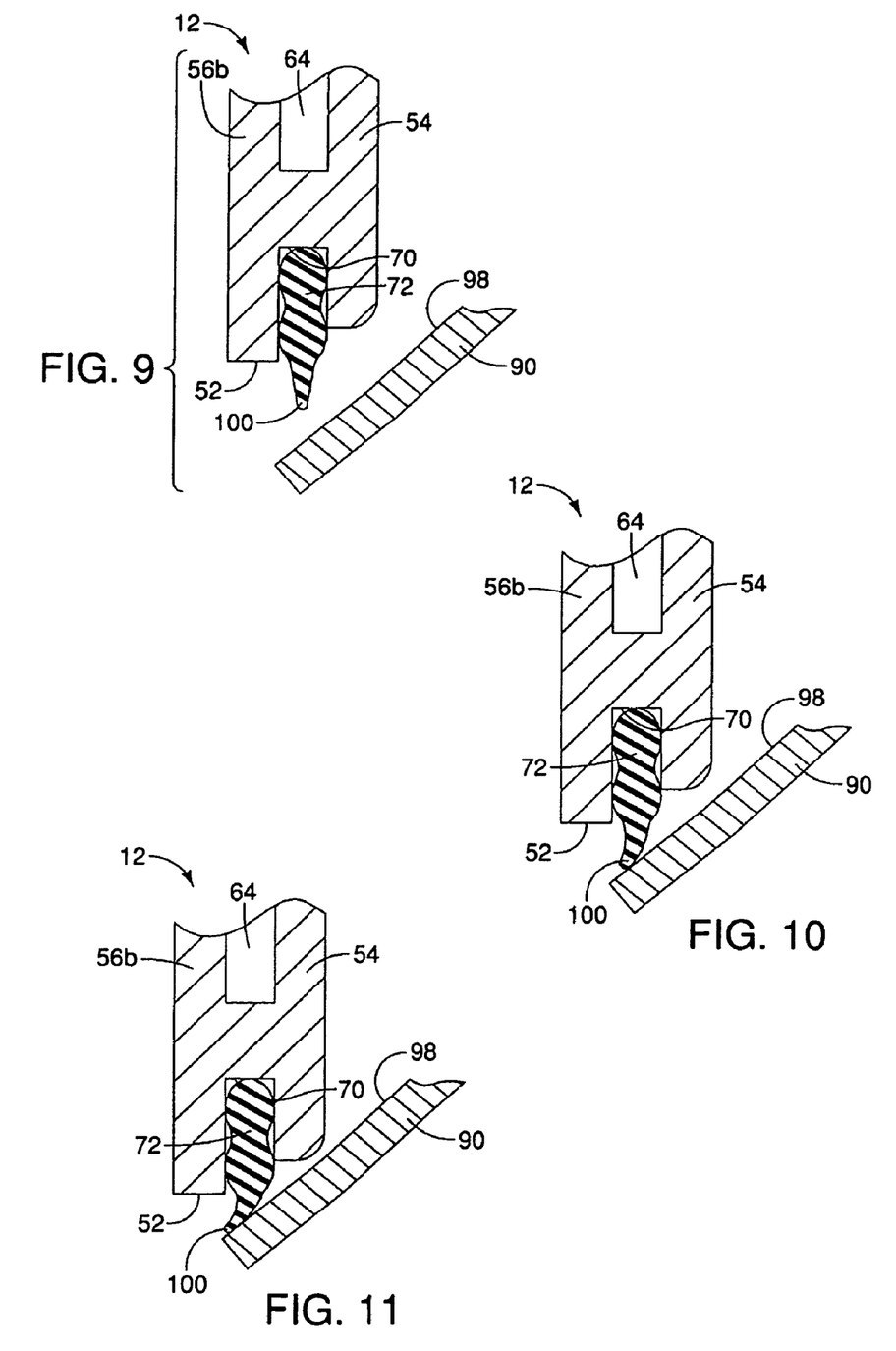
FIG. 9 is a cross-sectional view of a lower end portion of the filter, showing a seal of the self-cleaning trap mechanism, with the self-cleaning trap mechanism in the opened orientation in accordance with the first embodiment of the present invention.
FIG. 10 is another cross-sectional view of the lower end portion of the filter similar to FIG. 9, showing the seal of the self-cleaning trap mechanism contacting a plug member of the self-cleaning trap mechanism, with the self-cleaning trap mechanism in an intermediate orientation in accordance with the first embodiment of the present invention.
FIG. 11 is yet another cross-sectional view of the lower end portion of the filter similar to FIG. 9, showing the seal of the self-cleaning trap mechanism wiping the plug member of the self-cleaning trap mechanism, with the self-cleaning trap mechanism in the closed orientation in accordance with the first embodiment of the present invention.
Figure 12:
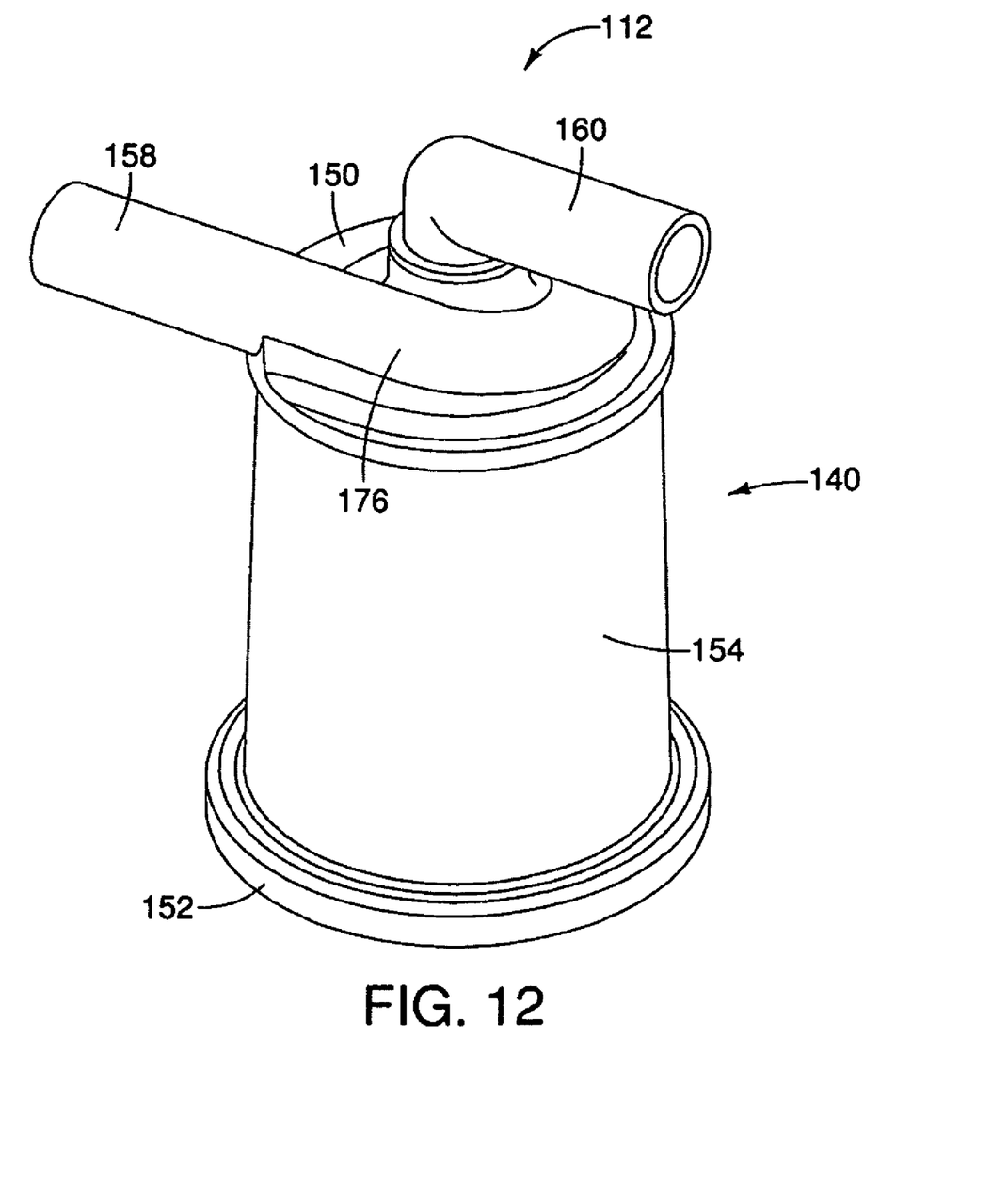
FIG. 12 is a perspective view of a filter shown removed from the fuel vapor treatment system in accordance with a second embodiment of the present invention.
Figure 13:
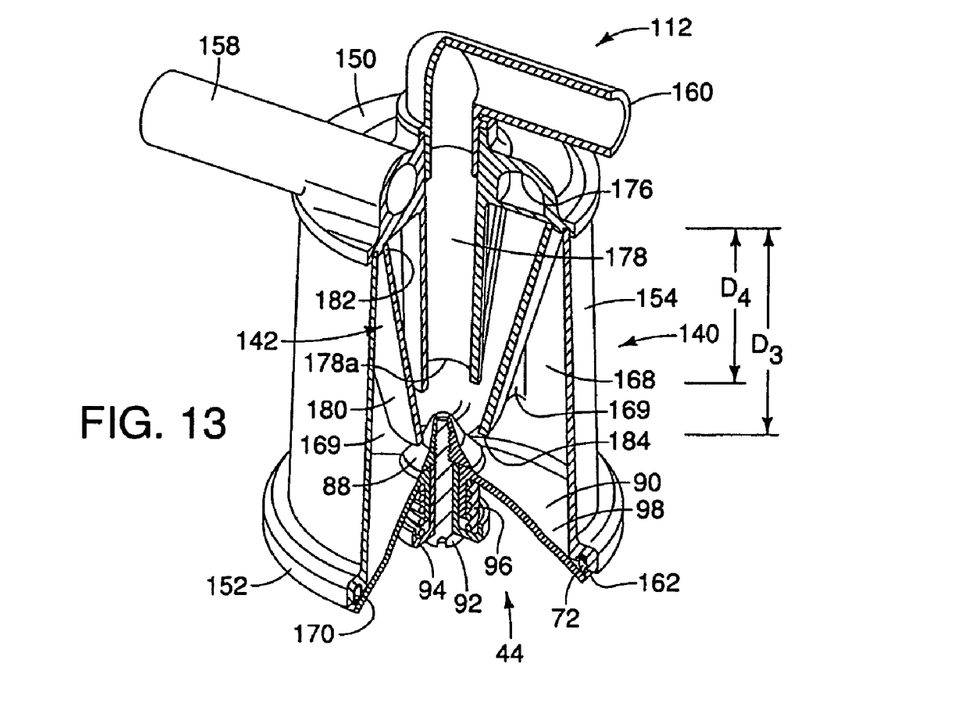
FIG. 13 is a perspective view of the filter depicted in FIG. 12 with a cutaway section showing internal features of the filter such as the self-cleaning trap mechanism shown in a closed orientation in accordance with the second embodiment of the present invention.
Figure 14:
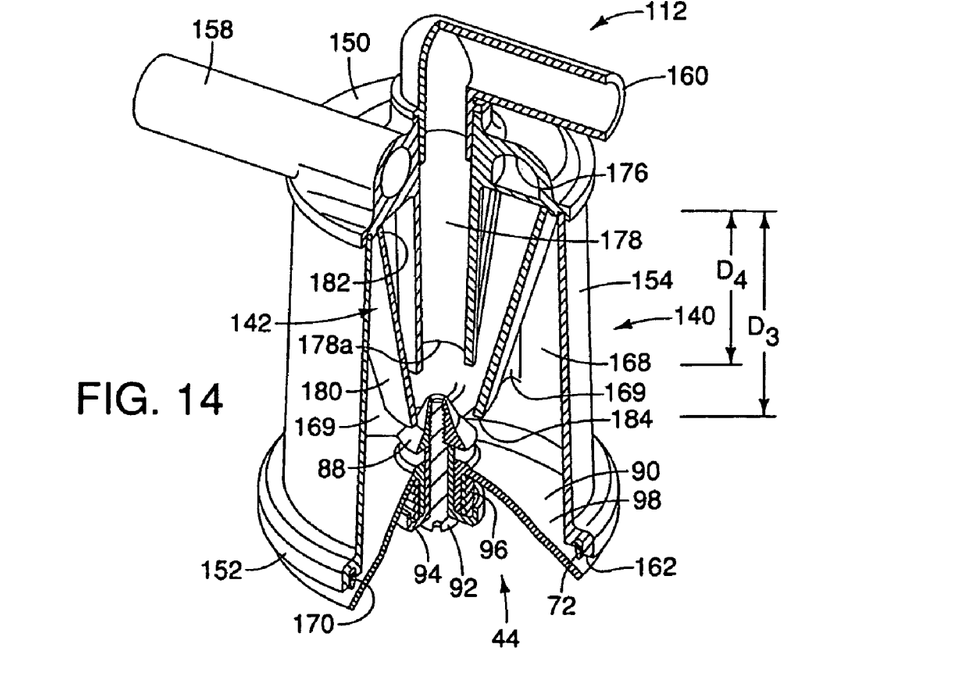
FIG. 14 is another perspective view of the filter depicted in FIG. 12, similar to FIG. 13, with a cutaway section showing the internal features of the filter such as the self-cleaning trap mechanism shown here in the open orientation in accordance with the second embodiment of the present invention.

Another feature of the present invention relates to the configuration of the seal 72. As shown in FIGS. 9, 10 and 11, the seal 72 includes a flexible lip 100 dimensioned to wipe an edge portion of the plug 90 when the plug 90 moves from the open orientation to the closed orientation. More specifically, the seal 72 is configured to wipe residue and/or particulate from the edge portion (or outer perimeter) of the convex inner surface 98 as the plug 90 moves from the open orientation depicted in FIG. 9 to the closed position depicted in FIG. 11.

FIG. 9 shows the plug 90 in the open orientation. In the open orientation, the seal 72 relaxes and returns to its original pre-installed shape where a flexible lip 100 extends away from the housing 40 in a downward direction. FIG. 10 shows the plug 90 moved to an intermediate orientation, between the opened orientation and the closed orientation. In this intermediate orientation, the seal 72 begins to contact the edge portion of the convex inner surface 98 of the plug 90. Continued upward movement of the plug 90 causes the flexible lip 100 to further deform, wiping the edge portion of the convex inner surface 98 of the plug 90.

As shown in FIGS. 7 and 8, the annular outer wall 56 includes the upper portion 56a and the lower portion 56b. In the depicted embodiment, the upper portion 56a is unitarily formed with the upper end 50. In other words, the upper end 50, the inlet 58, the spiral shaped passageway 76 and the upper portion 56a are molded or formed as a single unit in the depicted first embodiment. Further, the lower portion 56b of the annular outer wall 56, the annular inner wall 54, the lower end 52, the inverted conically-shaped member 80 and the support portion 88 are also unitarily formed or molded as a single unit. However, it should be understood from the drawings and description herein that the various elements of the filter 12 can be molded, manufactured or otherwise machined as separate elements by any of a variety of methods or techniques. The present invention is not limited to the formation of the specific combinations of elements molded or formed as a single unit. Alternative combinations of assembled elements of the present invention are possible and remain consistent with the features of the present invention, as demonstrated in the second embodiment.

Second Embodiment

Referring now to FIGS. 12-15, a filter 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The filter 112 of the second embodiment includes a housing 140, a cyclone-inducing structure 142 and the self-cleaning trap mechanism 44.

The housing 140 has an upper end 150, a lower end 152, an annular wall 154, an inlet 158, an outlet 160, a trap aperture 162, a central interior chamber 168, and the annular recess 70.

The upper end 150 includes the inlet 158 and a spiral shaped passageway 176 similar to the inlet 58 and the spiral shaped passageway 76 of the first embodiment. The lower end 152 includes the trap aperture 162 and an annular recess 170 that receives the seal 72. The seal 72 is identical in both the first and second embodiments and therefore includes the flexible lip 100 described above with respect to FIGS. 9-11. Thus, the seal 72 surrounds the trap aperture 162.

The annular wall 154 is a cylindrically shaped member that extends between the lower end 152 and the upper end 150 of the filter 112. The annular wall 154 can include a slight tapering or reduction in diameter going from the lower end 152 to the upper end 150. Gussets 169 are formed with the annular wall 154. The gussets 169 extend radially inward into the central interior chamber 168 formed within the annular wall 154.

The outlet 160 is attached to the upper end 150 of the filter 112 and is disposed at a central region of the upper end 150 of the housing 140. More specifically, the outlet 160 is pivotally attached to the upper end 150 such that the outlet 160 can be pivoted to a variety of positions relative to the upper end 150 of the filter 112. The outlet 160 further includes an outlet duct 178 that extends downward within an inverted conically-shaped member 180 of the cyclone-inducing structure 142. Consequently, the outlet 160 has an outlet opening 178a at a lower end of the outlet duct 178 that is disposed proximate a lower open end 184 of the cyclone-inducing structure 142.

The cyclone-inducing structure 142 is similar to the cyclone-inducing structure 42 of the first embodiment. Specifically, the cyclone-inducing structure 142 includes the spiral shaped passageway 176 and the inverted conically-shaped member 180.

Figure 15:
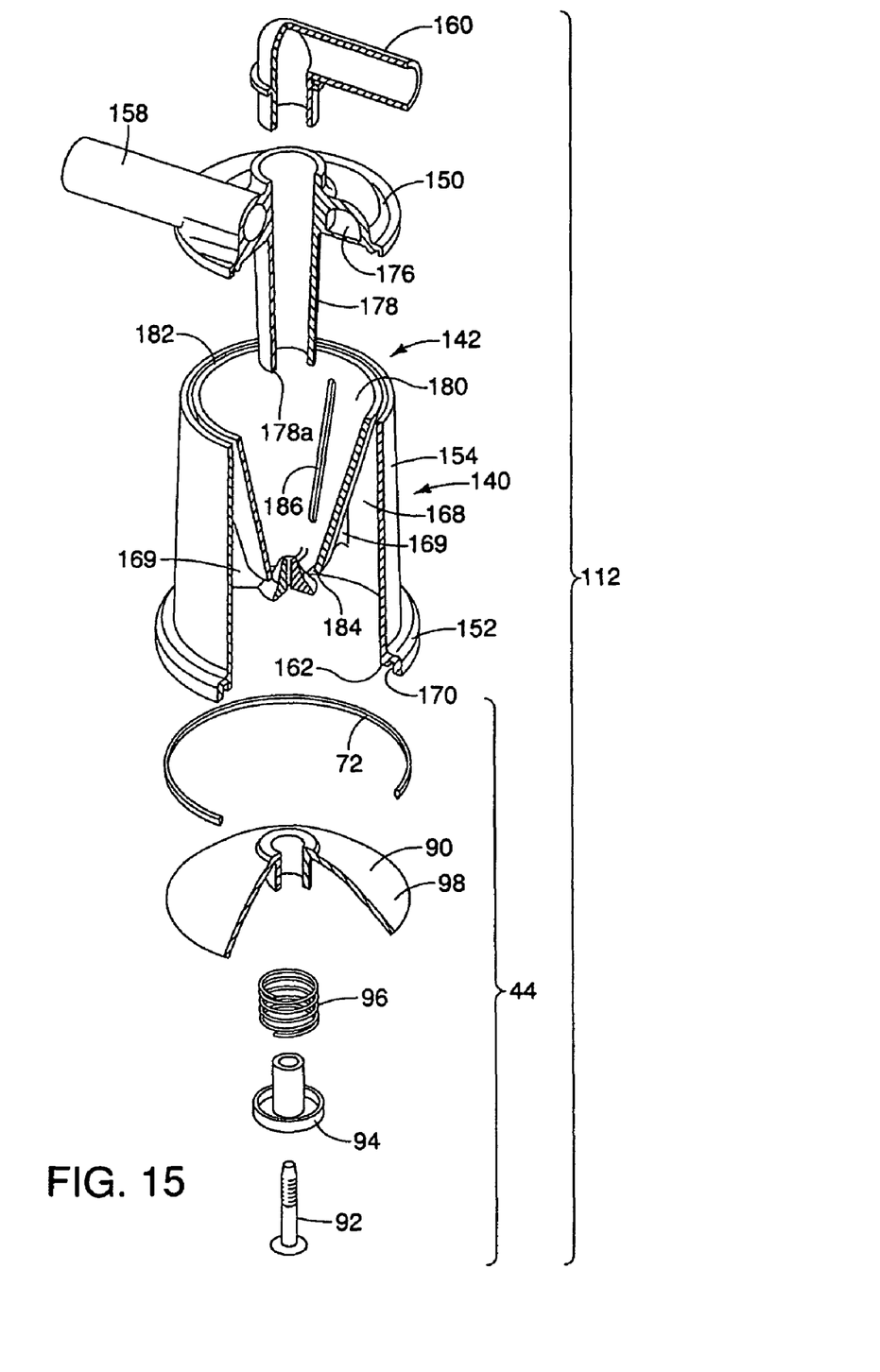
FIG. 15 is a perspective exploded view of the filter depicted in FIG. 12 with a cutaway section, showing the various elements of the filter in accordance with the second embodiment of the present invention.

The inverted conically-shaped member 180 includes an upper open end 182, a lower open end 184 and plurality of gusset receiving recesses 186, as shown in FIG. 15. The upper open end 182 is dimensioned to mate with the upper end 150 of the housing 140. The gusset receiving recesses 186 are dimensioned to mate with the gussets 169 such that the inverted conically-shaped member 180 is supported on the gussets 169 within the annular wall 154. The inverted conically-shaped member 180 extends a distance $D_3$ (shown in FIGS. 13 and 14) between the upper open end 182 and the lower open end 184.

The outlet duct 178 extends downward from the upper end 150 of the housing 140 and the upper open end 182. Specifically, the outlet duct 178 extends into the inverted conically-shaped member 180 a distance $D_4$ (shown in FIGS. 13 and 14). Further, the distance $D_4$ is less than the distance $D_3$. Preferably, the distance $D_4$ is at least 70 percent of the distance $D_3$.

The self-cleaning trap mechanism 44 is the same as in the first embodiment and includes the support portion 88, the plug 90, the fastener 92, the retainer 94 and the biasing spring 96 of the first embodiment. Therefore, description of the self-cleaning trap mechanism 44 is omitted for the sake of brevity.

The filter 112 is manufactured differently from the filter 12 of the first embodiment. Specifically, in the second embodiment, the filter 112 is manufactured with several elements molded or manufactured as a single unit. For instance, the upper end 150 is molded, formed or manufactured integrally with the inlet 158, and the spiral-shaped passageway 176 and the outlet duct 178 are formed as a single unit, as indicated in FIG. 15. The annular wall 154 is molded, formed or manufactured integrally with the gussets 169 as a single unit. Further, the inverted conically-shaped member 180 is molded, formed or manufactured integrally with the support portion 88 of the self-cleaning trap mechanism 44 as a single unit.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle filter assembly comprising:
   a housing having an inlet, an outlet, a trap aperture, an upper end, a lower end and a side wall extending between the upper and lower ends, with the outlet being formed in the side wall adjacent the lower end of the housing;
   a cyclone-inducing structure disposed within the housing between the inlet and the outlet to separate particulate from gases passing through the housing from the inlet to the outlet; and
   a self-cleaning trap mechanism movably arranged with respect to the trap aperture to move between a closed orientation sealing the trap aperture and an opened orientation exposing the trap aperture to release particulate from the housing.

2. A vehicle filter assembly comprising:
   a housing having an inlet, an outlet, a trap aperture, an annular inner wall and an annular outer wall, with a hollow chamber defined between the inner wall and the outer wall and a central interior chamber defined by the inner wall;
   a cyclone-inducing structure disposed within the housing between the inlet and the outlet to separate particulate from gases passing through the housing from the inlet to the outlet, the cyclone-inducing structure being disposed within the central interior chamber, the outlet being formed in the outer wall, and the inner wall including a fluid communication passage between the inner wall and the outer wall; and a self-cleaning trap mechanism movably arranged with respect to the trap aperture to move between a closed orientation sealing the trap aperture and an opened orientation exposing the trap aperture to release particulate from the housing.

3. The vehicle filter assembly according to claim 2, wherein
the fluid communication passage includes an annular gap defined between an upper end of the housing and an upper end of the inner wall.

4. The vehicle filter assembly according to claim 3, further comprising
a filter element disposed in the annular gap.

5. The vehicle filter assembly according to claim 2, further comprising an annular seal disposed between the housing and the trap mechanism.

6. A vehicle filter assembly comprising:
a housing having an inlet, an outlet and a trap aperture;
a cyclone-inducing structure disposed within the housing between the inlet and the outlet to separate particulate from gases passing through the housing from the inlet to the outlet, the cyclone-inducing structure including an inverted conically-shaped member with an upper open end in fluid communication with the inlet and a lower open end in fluid communication with the outlet, with the upper open end of the conically-shaped member having a first diameter and the lower open end having a second diameter that is smaller than the first diameter; and
a self-cleaning trap mechanism movably arranged with respect to the trap aperture to move between a closed orientation sealing the trap aperture and an opened orientation exposing the trap aperture to release particulate from the housing.

7. The vehicle filter assembly according to claim 6, wherein
the trap mechanism includes a plug dimensioned to cover the trap aperture with the trap mechanism in the closed orientation, the plug being supported at a lower end of the cyclone-inducing structure.

8. The vehicle filter assembly according to claim 7, wherein
the plug is biased to move to the closed orientation.

9. The vehicle filter assembly according to claim 7, wherein
the trap mechanism includes a spring member biasing the plug to the closed orientation such that the plug moves to the opened orientation in response to a predetermined downward force acting on the plug.

10. The vehicle filter assembly according to claim 9, wherein
the spring member is dimensioned to apply at least 5N of force against the plug to the closed orientation.

11. The vehicle filter assembly according to claim 7, wherein
the plug has an inner surface with a convex shape.

12. The vehicle filter assembly according to claim 6, further comprising an annular seal disposed between the housing and the trap mechanism.

13. The vehicle filter assembly according to claim 12, wherein
the seal includes a flexible lip dimensioned to wipe an edge portion of the trap mechanism when the trap mechanism moves from the open orientation to the closed orientation.

14. The vehicle filter assembly according to claim 6, wherein
the lower end of the cyclone-inducing structure is located above the trap aperture.

15. The vehicle filter assembly according to claim 6, wherein
the outlet is disposed at a central region of an upper end of the housing and includes an outlet duct that extends downward within the inverted conically-shaped member such that an outlet opening at a lower end of the outlet duct is disposed proximate the lower open end of the cyclone-inducing structure.

16. The vehicle filter assembly according to claim 15, wherein
the inverted conically-shaped member extends a first distance between the upper open end and the lower open end thereof and the outlet duct extends a second distance between the upper open end of the inverted conically-shaped member and the outlet opening, the second distance being less than the first distance.

17. The vehicle filter assembly according to claim 16, wherein
the second distance is at least 70 percent of the first distance.

18. The vehicle filter assembly according to claim 6, wherein
the outlet is disposed at a central region of an upper end of the housing and includes an outlet duct that extends downward within the cyclone-inducing structure such that an outlet opening at a lower end of the outlet duct is disposed proximate a lower open end of the cyclone inducing structure.

19. A vehicle filter assembly comprising:
a housing having an inlet provided at an upper end of the housing, an outlet and a trap aperture;
a cyclone-inducing structure disposed within the housing between the inlet and the outlet to separate particulate from gases passing through the housing from the inlet to the outlet, the cyclone-inducing structure including a spiral-shaped duct fluidly connected to the inlet; and
a self-cleaning trap mechanism movably arranged with respect to the trap aperture to move between a closed orientation sealing the trap aperture and an opened orientation exposing the trap aperture to release particulate from the housing.

20. The vehicle filter assembly according to claim 19, wherein
the outlet is disposed at a central region of the upper end of the housing with the spiral-shaped duct at least partially surrounding the outlet, the outlet including an outlet duct that extends downward within the cyclone-inducing structure such that an outlet opening at the lower end of the outlet duct is disposed proximate a lower end of the cyclone-inducing structure.

* * * * *